United States Patent Office 3,452,169
Patented June 24, 1969

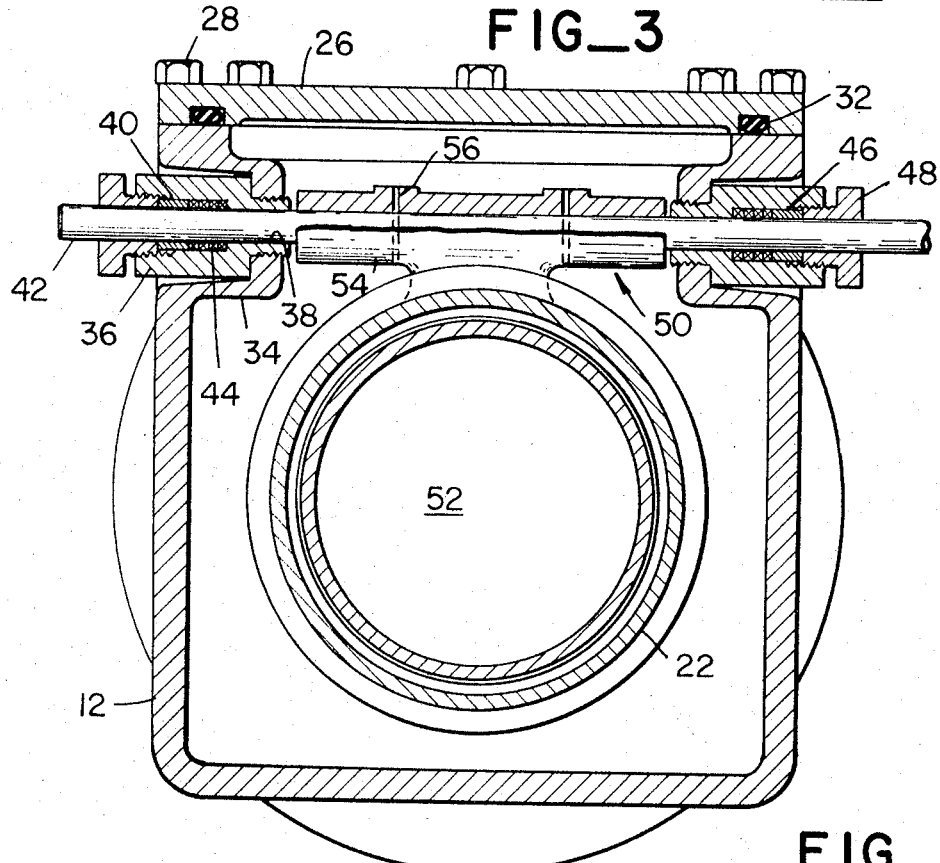
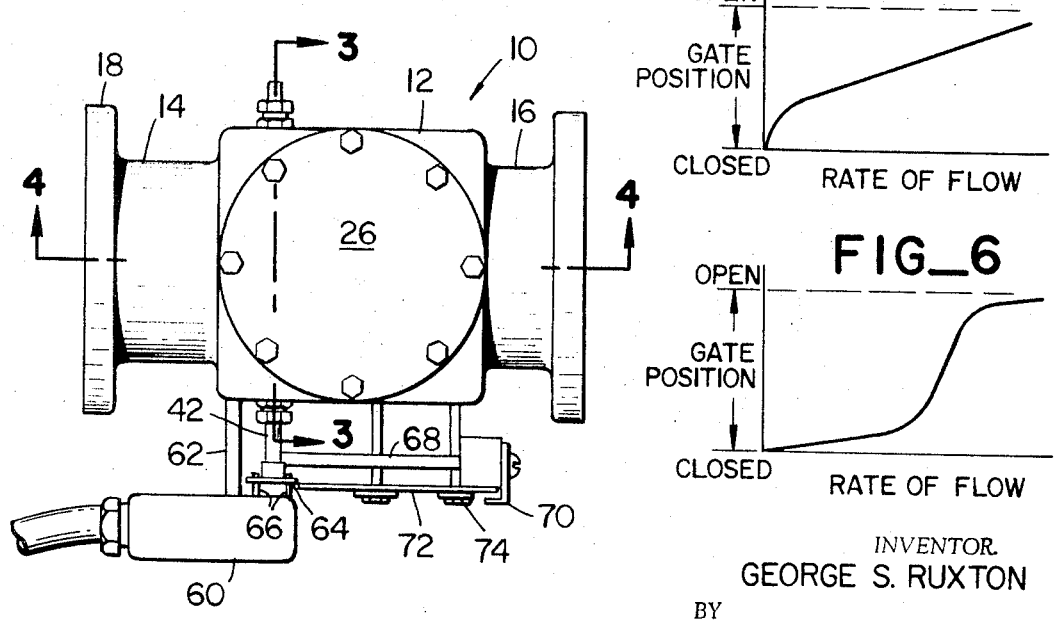

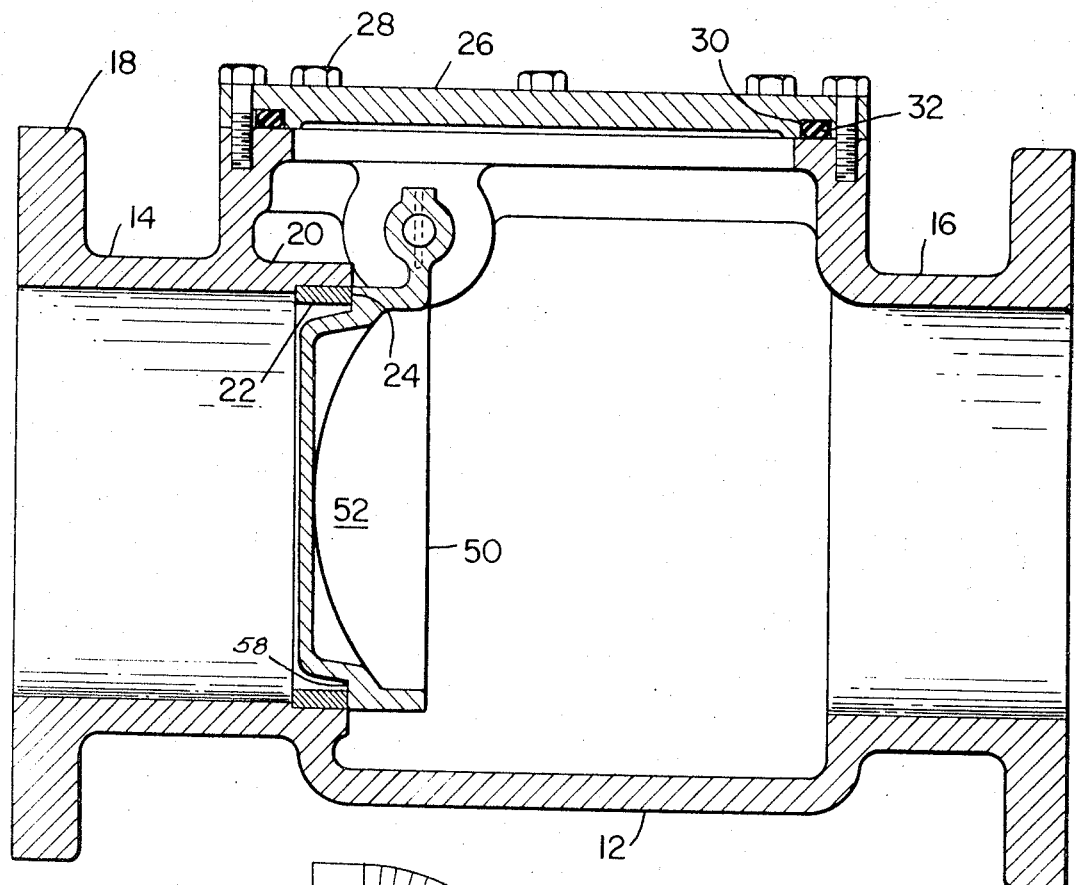
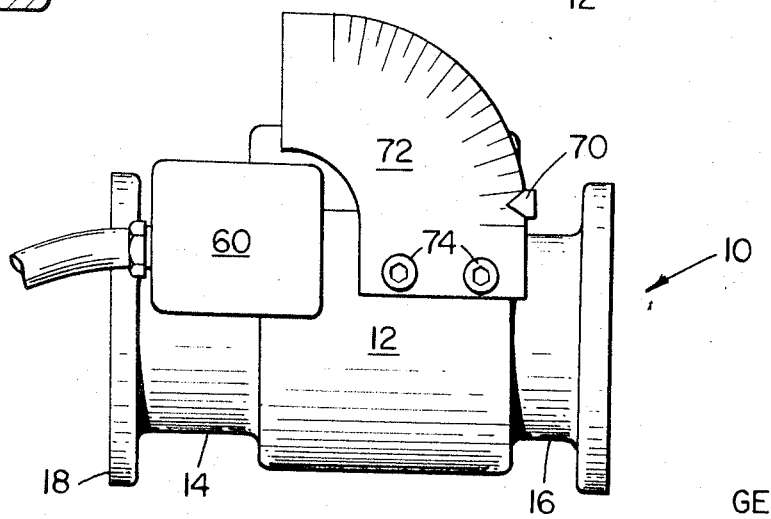

3,452,169
FLOW MEASURING DEVICE
George S. Ruxton, Oakland, Calif., assignor to Pacific Pumping Company, Oakland, Calif., a corporation of California
Filed Feb. 20, 1967, Ser. No. 617,394
Int. Cl. H01h 35/24, 35/40
U.S. Cl. 200—81.9               4 Claims

ABSTRACT OF THE DISCLOSURE

A flow regulator for fluid conduit systems comprises a body within which is a movable gate which is positioned in the path of fluid flow into the regulator. The gate is shaped and mounted in such a manner that its movement relative to the amount of flow is substantially linear. The regulator has other features of construction which provide unusual features of easy maintenance and economy of manufacture.

This invention relates to an improved flow regulator for fluid conduit systems.

In fluid systems of various types it is often necessary or desirable to control certain devices in a manner relating to the flow rate of fluid in a conduit. For example, in a water supply system for a large building the inlet conduit may be connected to two or more pumps of different sizes so that one pump can be made to operate under normal conditions, but if the consumption of water increases a second will automatically be actuated to increase the flow and satisfy the demand. A general problem prior to the present invention was to provide a flow regulator device in a fluid conduit system capable of producing a control signal for actuating other devices in the system such as pumps and the like.

Previous attempts to provide a satisfactory flow regulator resulted in relatively complicated and generally unsatisfactory devices. In prior devices which utilized a movable or vane, the degree of movement of the vane failed to produce a linear relationship with the actual amount of fluid flow. This required each regulator to be calibrated for actual flow over the complete range of travel of the vane, and reliable accuracy was not available. Thus, another object of the present invention is to solve this problem and provide a regulator that is highly sensitive to flow rate variations and more specifically, one which has a linear characteristic of vane shaft movement relative to flow and which is therefore accurate and requires a minimum of calibration. With my regulator, the flow rate at which a device such as another pump can be signaled can be easily determined and set in conjunction with a suitable switch, after which the regulator will provide reliable and accurate response.

Another object of the present invention is to provide a flow regulator that will produce control signals at various flow rates and one that is rugged and durable, as well as easy to install and maintain.

Still another object is to provide a flow regulator that can be used with a wide variety of fluid conduit systems and which is particularly adaptable for ease and economy of operation.

Other objects, advantages and features of the present invention will become apparent from the following detailed description of one embodiment thereof presented with the accompanying drawings, in which:

FIG. 1 is a plan view of a flow regulator embodying the principles of the present invention;

FIG. 2 is a view in side elevation of the flow regulator of FIG. 1;

FIG. 3 is a view in section taken along the line 3—3 of FIG. 1;

FIG. 4 is a view in section taken along the line 4—4 of FIG. 1;

FIG. 5 is a typical curve for the regulator of FIGS. 1–4 plotting gate shaft rotation against amount of flow;

FIG. 6 is a typical curve for prior art regulator devices plotting shaft rotation against amount of flow.

Referring to the drawings, FIGS. 1 and 2 show a flow regulator valve 10 embodying the principles of the present invention which may be installed in any fluid conduit system where it is necesary to provide control signals corresponding to certain fluid flow conditions. In general, the valve comprises a central body 12 having tubular portions 14 and 16 extending from opposite sides which are each preferably provided with flanges 18 to facilitate their connection to pipe sections. The entire valve body may be cast as an integral unit from some suitable material such as iron.

As shown in FIGS. 3 and 4, the valve central body may, for convenience, have an oblong shape with flat sides on the side forming the inlet to the valve. An inner tubular portion 20 extends inwardly from the body side wall and terminates in a plane perpendicular to the axis of the tubular portion 14. Fixed within and flush with the end face of the extended end portion is a ring member 22 preferably of non-corrosive metal such as bronze, which may be secured in position by being driven axially into place. This ring member prevents the accumulation of dirt and corrosion and thus provides a smooth annular end face 24 at all times.

A top member 26 provides a removable cover for the regulator body 12 and is secured thereto by a series of machine bolts 28. A circular groove 30 spaced inwardly from the bolt holes provides a seat for a rubber O-ring 32 that seals the top member when it is installed.

As seen in FIG. 3, a pair of inwardly extending integral boss members 34 are provided at opposite sides of the body near its top. Threadedly secured in each boss member is a bearing plug 36 having a small bore 38 at its inner end which adjoins a slightly large bore 40 that continues to the opposite outer end of the plug. A cylindrical shaft member 42 is supported by the bearing plugs 36 fitting within the small bore portion of each with the clearance that is necessary to provide for rotation of the shaft with a minimum degree of friction. A suitable packing 44 is provided in the enlarged bore 40 of each bearing plug which is compressed into its sealing position by a sleeve 46. The latter is held in position by a retaining nut 48 which is threaded within the enlarged outer bore 40 of the bearing plug. The shaft 42 is thus free to rotate in the supporting bearing plugs and yet is well sealed at both ends so that no fluid can escape from the body 12.

Attached to the shaft 42 is a gate 50 which is free to move within the valve body due to the fluid which flows through it. The gate 50 has a lower portion 52 which is circular in plan form as seen in FIG. 3, and an upper tubular portion 54 having an axis transverse to that of the lower portion. The shaft 42 fits snugly within the bore of the upper tubular gate portion 54 and is retained thereon by a pair of transverse pins 56. Thus, the gate and the shaft move as one member about the center line of the shaft as the axis of rotation.

As shown in FIG. 4, the lower gate portion is a generally frusto-conical member which is surrounded by an annular shoulder 58 that lies in plane transverse to the central axis of the frusto-conical member. When the gate is in the down position, as when no fluid is flowing through the conduit, the shoulder 58 fits flush against the smooth annular face 24 of the insert ring 22. It will be noted that the frusto-conical member of the gate extends forward or upstream of the gate shaft 42 and well into the projecting end portion 20 of the valve body 12. The unique shape of the gate and the position of its pivotal axis is an important feature of my invention because it produces two operating characteristics that are highly desirable, if not essential, in a flow regulator. The first of these is the fact that at low flow rates the gate is more sensitive to flow rate and thus its shaft will move angularly an amount necessary to actuate any switches that would be desired to operate at low flow rates. This relatively greater amount of movement of the gate at low flow rates is due largely to the frusto-conical portion which extends into and partially blocks the path of flow even as the gate has moved initially a considerable amount. The other desirable characteristic produced by my gate arrangement, as shown in FIG. 5, is that as the flow rate increases, its relationship with gate travel becomes essentially linear. This enables my regulator 10 to be easily preset and calibrated to perform as required in a fluid conduit system. Flow regulation devices heretofore available generally produced flow rate vs. gate travel curves similar to that shown in FIG. 6 and were thus lacking in the aforesaid desirable features.

Since gate movement and thus the rotation of its shaft is directly proportional to the amount of fluid flow through the housing a switch 60 may be connected directly to the flow regulator 10, as shown in FIG. 1. The switch may be of any suitable type which, when connected to the gate shaft, will open or close certain contacts as the shaft rotates to preselected positions. In the arrangement shown, the switch is contained in a housing which is rigidly fixed by a bar 62 to the valve body 12. Attached to the end of the shaft 42 is a plate 64 which engages a pair of actuating pins 66 that extend from the switch. The latter pins are connected internally in a suitable manner to a mechanism for operating the switch contacts at various angles of the shaft. It is to be understood that various forms of switches which are actuated by shaft positions may be used within the scope of my invention. Such switches are commercially available, as for example, the type AS Switch Kit made by Penn Controls, Inc. of Goshen, Ind., which I have found to be satisfactory.

The gate shaft 42 may also furnish a constant visual indication of the gate position when the flow regulator is operating. This is accomplished by means of an indicator bar 68 connected at a right angle to the shaft 42 near its end. The bar 68 is provided with a pointer member 70 at its end which is curved back around the edge of a curver indicator card 72, the latter being angularly subdivided into increments of shaft angular position. The card 72 is conveniently attached to the valve body by a pair of machine screws 74 and is initially positioned thereon so that the position of the pointer relative to the indicia on the card will correspond to the actual position of the valve gate 50.

In operation, the flow regulator 10 in a typical installation may be placed in a fluid conduit in the conventional manner with its switch 60 connected to one or more pumps (not shown) that supply fluid to the conduit. The switch is preset internally so that it will be actuated when preselected shaft positions and hence predetermined flow rates occur. When fluid flows into the regulator 10 it impinges against the gate 50 which by virtue of its weight and the location of the pivotal axis of its shaft 42 is normally in the down or closed position. The fluid force on the gate causes it to pivot about its axis an amount directly proportional to the force and hence the amount of flow As previously stated with reference to FIG. 5, the gate positions are directly proportional to the amount of flow. If the flow decreases to a predetermined level the gate will move toward its closed position and the gate shaft will rotate accordingly. Upon reaching a preselected shaft position the switch 60 will be actuated and thereby provide a control signal to another pump or to whatever apparatus it is desired to employ in the system.

From the foregoing it should be apparent that the present invention provides a flow regulator which is not only reliable and accurate but one which, because of its unique simplicity, is unusually easy to install and maintain. The top can easily be removed if inspection of the body chamber is required or to remove any accumulation of foreign material. However, the lubrication and sealing of the gate shaft to assure its proper operation can be accomplished easily by merely removing the nuts 48 which retain the packing material.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:
1. A flow regulator for use in a fluid conduit system comprising:
  a central body forming a chamber with integral inlet and outlet sections connectable to fluid conduit members;
  means in said body for supporting a rotatable shaft having an axis in a plane perpendicular to the axis of said inlet section;
  means for providing an annular seat at said inlet section;
  a gate means in said body located transversely to the direction of fluid flow therethrough, said gate means being attached to and thus movable about said shaft axis and including a frusto-conical member which extends upstream from the plane containing said seat when said gate means is closed;
  and switch means connected to and actuated by said shaft when it is rotated to a preselected position corresponding to a particular flow rate of fluid through said regulator.
2. The regulator as described in claim 1 including an inner portion of said inlet section extending within said central body; a circular ring forming said seat having a flat annular end surface and fixed within said inner portion; and means on said gate means forming an annular shoulder around said frusto-conical member which engages said end surface when the gate means is closed.
3. The regulator as described in claim 1 including a pair of integral boss members extending into the chamber formed by said body; a removable bearing plug in each said boss means for supporting said shaft, and sealing means around said shaft retained in each said bearing plug.
4. The regulator as described in claim 1 including an arm fixed to said gate shaft outside said body; a pointer means on said arm; and an indicator card means attached to said body and located adjacent said pointer means, said card having indicia for indicating the actual position of the gate shaft relative to said pointer.

References Cited
UNITED STATES PATENTS

| | | | |
|---|---|---|---|
| 534,631 | 2/1895 | Carpenter | 200—81.9 XR |
| 1,905,146 | 4/1933 | Chapin | 200—81.9 |
| 2,203,331 | 6/1940 | Hinsch. | |
| 2,293,574 | 8/1942 | Teach et al. | 200—81.9 |
| 2,687,457 | 8/1954 | Smith | 200—81.9 |
| 2,790,042 | 4/1957 | Porwancher | 200—81.9 |

ROBERT K. SCHAEFER, *Primary Examiner.*

H. BURKS, *Assistant Examiner.*

U.S. Cl. X.R.

73—228